US010761338B2

(12) United States Patent
Fukushima

(10) Patent No.: US 10,761,338 B2
(45) Date of Patent: Sep. 1, 2020

(54) IMAGE SHAKE CORRECTION DEVICE, LENS DEVICE, AND IMAGING DEVICE

(71) Applicant: FUJIFILM Corporation, Tokyo (JP)

(72) Inventor: Hajime Fukushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 309 days.

(21) Appl. No.: 15/987,127

(22) Filed: May 23, 2018

(65) Prior Publication Data
US 2018/0267328 A1 Sep. 20, 2018

Related U.S. Application Data

(63) Continuation of application No. PCT/JP2016/083713, filed on Nov. 14, 2016.

(30) Foreign Application Priority Data

Nov. 24, 2015 (JP) ................. 2015-228605

(51) Int. Cl.
G02B 27/64 (2006.01)
G03B 5/02 (2006.01)
(Continued)

(52) U.S. Cl.
CPC ............. G02B 27/646 (2013.01); G03B 5/02 (2013.01); H04N 5/225 (2013.01); H04N 5/232 (2013.01);
(Continued)

(58) Field of Classification Search
None
See application file for complete search history.

(56) References Cited

U.S. PATENT DOCUMENTS 6,064,827 A    5/2000 Toyoda
6,091,900 A *  7/2000 Kaneda ................ G02B 27/646
                                                    348/208.11
(Continued)

FOREIGN PATENT DOCUMENTS

JP    2002-182258 A    6/2002
JP    2003-241059 A    8/2003
(Continued)

OTHER PUBLICATIONS

German Office Action for corresponding German Application No. 112016005146.8, dated Jun. 14, 2019, with English translation.
(Continued)

Primary Examiner — Derek S. Chapel
(74) Attorney, Agent, or Firm — Birch, Stewart, Kolasch & Birch, LLP

(57) ABSTRACT

An image shake correction device includes: a base member; a lens frame that holds an image shake correction lens, and is mounted on the base member so as to be movable in a first direction and a second direction perpendicular to the first direction within a plane perpendicular to an optical axis of the image shake correction lens; a plurality of expandable and contractible mooring members that moors the lens frame to the base member such that the lens frame is able to move in the first direction and the second direction; a bracket that is supported by the base member so as to be swingable around a first axis parallel to the first direction; and a driving unit that drives the lens frame in the first direction and the second direction, as defined herein.

18 Claims, 10 Drawing Sheets

(51) Int. Cl.
*H04N 5/225* (2006.01)
*H04N 5/232* (2006.01)

(52) U.S. Cl.
CPC . *H04N 5/23287* (2013.01); *G03B 2205/0015* (2013.01)

(56) References Cited

U.S. PATENT DOCUMENTS

| | | | |
|---|---|---|---|
| 2004/0057710 A1 | 3/2004 | Terao | |
| 2011/0013283 A1* | 1/2011 | Sato | G02B 27/646 359/557 |
| 2012/0219275 A1* | 8/2012 | Suzuka | H04N 5/2328 396/55 |
| 2015/0153584 A1* | 6/2015 | Yasuda | G02B 27/646 359/557 |

FOREIGN PATENT DOCUMENTS

| | | |
|---|---|---|
| JP | 2006-91142 A | 4/2006 |
| JP | 4552439 B2 | 9/2010 |
| JP | 5383743 B2 | 1/2014 |

OTHER PUBLICATIONS

International Preliminary Report on Patentability and English translation (Form PCT/IPEA/409) for Application No. PCT/JP2016/083713, dated Jul. 24, 2017.

Written Opinion of the International Searching Authority and International Search Report (Forms PCT/ISA/237 and PCT/ISA/210) for Application No. PCT/JP2016/083713, dated Feb. 14, 2017, with an English translation of the Search Report .

* cited by examiner

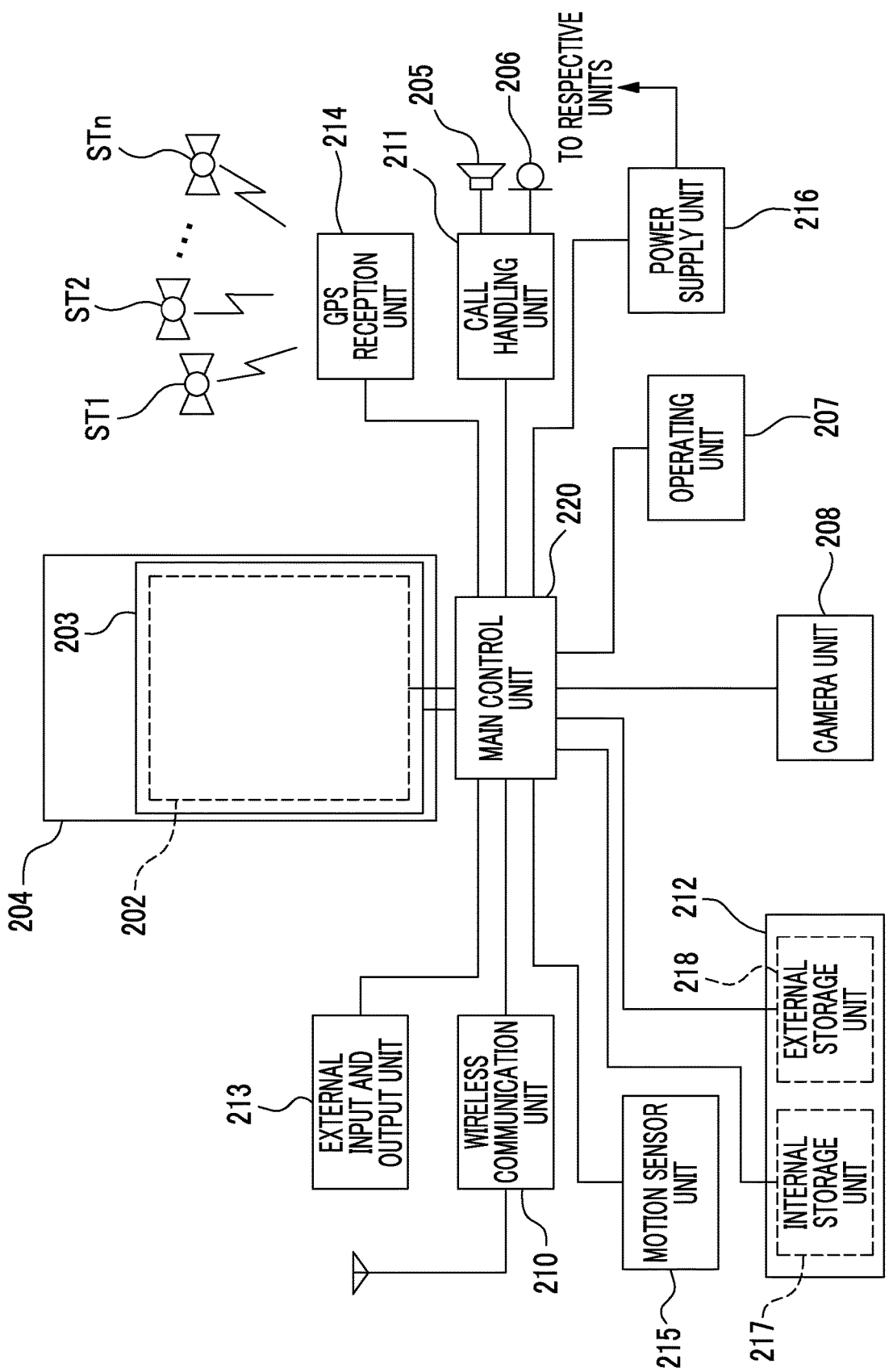

IMAGE SHAKE CORRECTION DEVICE, LENS DEVICE, AND IMAGING DEVICE

CROSS REFERENCE TO RELATED APPLICATION

This is a continuation of International Application No. PCT/JP2016/083713 filed on Nov. 14, 2016, and claims priority from Japanese Patent Application No. 2015-228605 filed on Nov. 24, 2015, the entire disclosures of which are incorporated herein by reference.

BACKGROUND OF THE INVENTION

1. Field of the Invention

The present invention relates an image shake correction device, a lens device and an imaging device including the image shake correction device.

2. Description of the Related Art

An image shake correction device that is built in an imaging device or a lens device to be detachably attached to the imaging device and corrects image shake caused by camera shake or the like has been known. In this type of the image shake correction device, a lens frame which holds an image shake correction lens is supported by a base member so as to be movable within a plane perpendicular to an optical axis, and a position of the lens frame on the base member is successively detected. The lens frame is moved by a driving unit such as a voice coil motor or the like based on the detected position, and image shake is corrected.

In a case where the lens frame rotates around the optical axis or an axis parallel to the optical axis, position detection accuracy of the lens frame may deteriorate, and trouble may be caused in the movement of the lens frame. Thus, the lens frame of which the rotation around the optical axis or the axis parallel to the optical axis is regulated is supported by the base member.

An image shake correction device described in JP5383743B includes a ground plate as a base member, a shift frame as a lens frame, a guide plate arranged between the ground plate and the shift frame, and two sets of rolling balls in which three rolling balls are used as one set. The guide plate is able to move in a first direction within a plane perpendicular to an optical axis, and is supported by the ground plate through one set of rolling balls. The shift frame is able to move in a second direction perpendicular to the first direction within the plane perpendicular to the optical axis, and is supported by the guide plate through one set of rolling balls. Two rolling balls of the one set of rolling balls capable of moving the guide plate are able to roll only in the first direction by guide grooves which extend in the first direction. Two rolling balls of one set of rolling balls capable of moving the shift frame are able to roll only in the second direction by guide grooves which extend in the second direction. The rotation around the optical axis of the shift frame or the axis parallel to the optical axis is regulated by the engagement of the rolling balls with the guide grooves.

An image shake correction device described in JP4552439B includes a base member, a lens frame, and a guide arm. The lens frame is able to move within a plane perpendicular to the optical axis, and is supported by the base member through three sliding pieces. The guide arm engages with the lens frame so as to be rotatable around a rotational axis which extends in the first direction within the plane perpendicular to the optical axis, and includes a guide shaft member parallel to the rotational axis. A pair of hook portions which supports the guide shaft member of the guide arm so as to be rotatable around the axis and to be movable along the axis is formed at the base member. The rotation around the optical axis of the shift frame or the axis parallel to the optical axis is regulated by the engagement of the guide shaft member with the pair of hook portions.

SUMMARY OF THE INVENTION

In the image shake correction device described in JP5383743B, since many rolling balls are required in order to regulate the rotation of the shift frame and some of the rolling balls roll only in one direction by the guide grooves, the number of components increases, and thus, the structure is complicated.

In the image shake correction device described in JP4552439B, since the rotation of the shift frame is regulated by the guide arm, it is possible to further reduce the number of components compared to the image shake correction device described in JP5383743B, and it is possible to simplify the structure.

However, the guide arm and the driving unit such as the voice coil motor are arranged on sides opposite to each other with a straight line passing through the optical axis interposed therebetween. Since the guide arm of the lens frame is relatively light, the lens frame easily rises up from the base member in a case where impact or vibration is applied to the lens frame. For the circumstances of the assembling, the hook portions of the base member that support the guide shaft member of the guide arm are formed by substantially U-shaped cutout portions opened to one side in the optical axis direction. Thus, in a case where the impact or the vibration is applied to the lens frame, there is a concern that the guide shaft member is separated from the hook portions.

The present invention has been made in view of the above-described circumstances, and it is an object of the present invention to provide an image shake correction device with a simple configuration and excellent reliability, and provide a lens device and an imaging device including the image shake correction device.

An image shake correction device of an aspect of the present invention comprises a base member, a lens frame that holds an image shake correction lens, and is mounted on the base member so as to be movable in a first direction and a second direction perpendicular to the first direction within a plane perpendicular to an optical axis of the image shake correction lens, a plurality of expandable and contractible mooring members that moors the lens frame to the base member such that the lens frame is able to move in the first direction and the second direction, a bracket that is supported by the base member so as to be swingable around a first axis parallel to the first direction, and a driving unit that drives the lens frame in the first direction and the second direction. The bracket has a guide portion arranged on a second axis parallel to the first direction. The lens frame has an engagement portion which engages with the guide portion so as to be movable along the second axis, to be relatively rotatable around the second axis, and to be detachably attached in an optical axis direction. The guide portion and the engagement portion are arranged on a side opposite to the driving unit while interposing a second straight line which is perpendicular to a first straight line passing through the optical axis and a center of the guide portion on the second axis and passes through the optical axis when viewed in the optical axis direction. A first mooring member that is formed so as to be adjacent to the guide portion and the engagement portion and a second mooring member that is arranged on a third straight line passing through the first mooring member and the optical axis and is arranged on a side opposite to the first mooring member with the second straight line interposed therebetween when viewed in the optical axis direction are included as the plurality of mooring members.

A lens device of another aspect of the present invention comprises the image shake correction device.

An imaging device of still another aspect of the present invention comprises the image shake correction device.

According to the present invention, it is possible to provide an image shake correction device with a simple configuration and excellent reliability, and to provide a lens device and an imaging device including the image shake correction device.

BRIEF DESCRIPTION OF THE DRAWINGS

FIG. 10 is a functional block diagram of the imaging device of FIG. 9.

EXPLANATION OF REFERENCES

Figure 1:
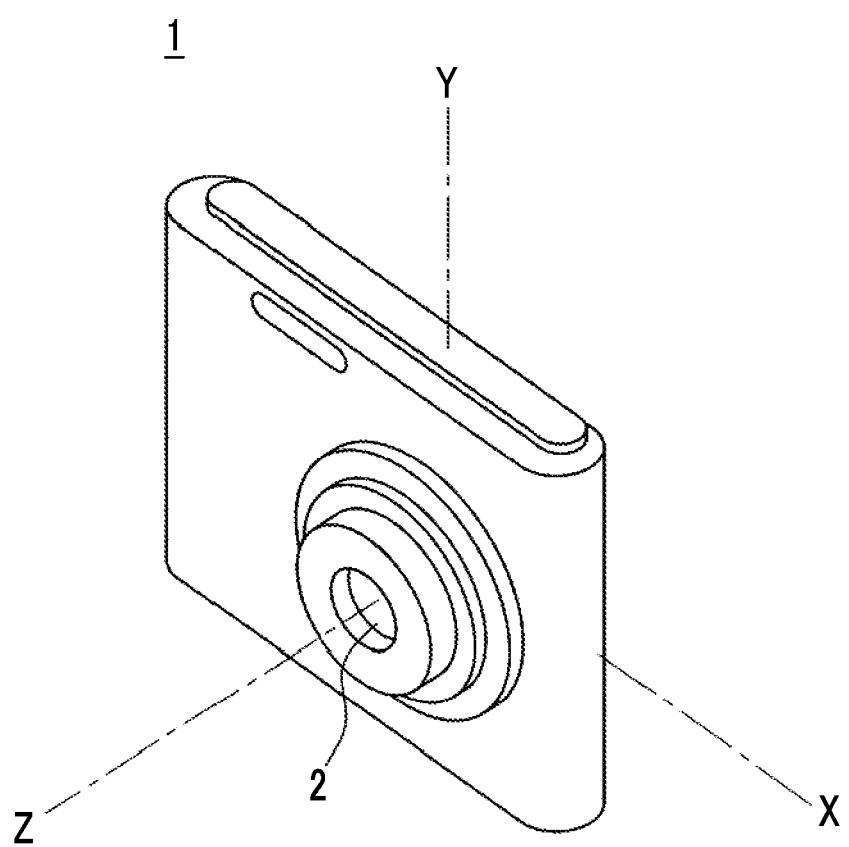
FIG. 1 is a perspective view of an example of an imaging device including an image shake correction device for describing an embodiment of the present invention.

1: digital camera
2: imaging optical system
2a: focus lens
2b: image shake correction lens
3: imaging element
4: processing unit
5: focus driving unit
6: control unit
7: signal processing unit
8: operating unit
9: main memory
10: storage unit
11: display unit
12: control bus
13: data bus
14: shake detection unit
15: image shake correction device
20: driving unit
21: detection unit
22: base member
23: lens frame
24: bracket
25: ball
26: first mooring member
27: second mooring member
28: third mooring member
29: fourth mooring member
30: voice coil motor
31: coil
32: magnet
33: magnet
34: yoke
40: support arm
41: swing arm
42: bridge
43: first shaft member
44: through-hole
45: second shaft member (guide portion)
45a: shaft member
45b: shaft member
46: engagement arm (engagement portion)
48: bridge
49: locking portion
50: locking portion
51: through-hole
52a: guide groove
52b: guide groove
53: ball
54a: engagement protrusion portion
54b: engagement protrusion portion
55: slot
200: smartphone
201: casing
202: display panel
203: operation panel
204: display input unit
205: speaker
206: microphone
207: operating unit
208: camera unit
210: wireless communication unit
211: call handling unit
212: storage unit
213: external input and output unit
214: reception unit
215: motion sensor unit
216: power supply unit
217: internal storage unit
218: external storage unit
220: main control unit
A: fan-like region
BS: base station device
HL1: half straight line
HL2: half straight line
L1: first straight line
L2: second straight line
L3: third straight line
L4: fourth straight line
NW: mobile communication network
ST1: satellite
STn: satellite

DESCRIPTION OF THE PREFERRED EMBODIMENTS

Figure 2:
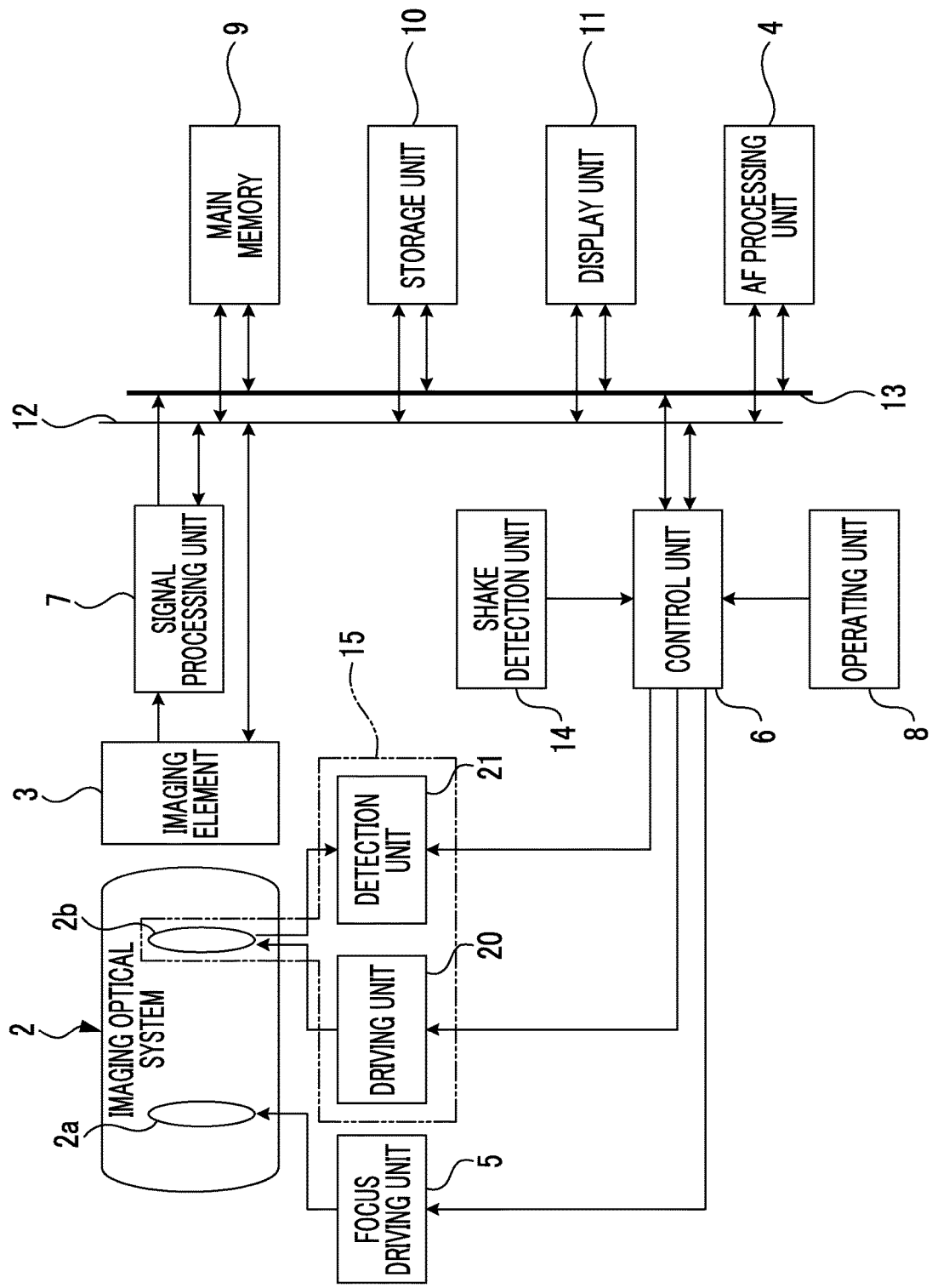
FIG. 2 is a functional block diagram of the imaging device of FIG. 1.

FIGS. 1 and 2 show a configuration of an example of an imaging device for describing an embodiment of the present invention.

A digital camera 1 as an example of the imaging device shown in FIGS. 1 and 2 includes an imaging optical system 2 that includes a focus lens 2a for adjusting a focus, an imaging element 3 that images a subject through the imaging optical system 2, an autofocus (AF) processing unit 4 that determines a focusing position of the focus lens 2a, a focus driving unit 5 that moves the focus lens 2a to the focusing position determined by the AF processing unit 4, and a control unit 6.

For example, a charge coupled device (CCD) type or complementary metal oxide semiconductor (CMOS) type image sensor is used as the imaging element 3.

Output signals of the imaging element 3 are converted into digital signals by a signal processing unit 7 through analog signal processing such as correlative double sampling processing. The signal processing unit 7 generates image data by performing digital signal processing such as interpolation calculation, gamma correction calculation, RGB/YC conversion processing, and the like on the digital signals converted from the output signals of the imaging element 3.

For example, the AF processing unit 4 determines the focusing position of the focus lens 2a by an AF method such as a contrast method based on the image data generated by the signal processing unit 7. The control unit 6 controls the focus driving unit 5, and moves the focus lens 2a to the focusing position determined by the AF processing unit 4.

A command signal such as an imaging command from a user is input to the control unit 6 from an operating unit 8. The control unit 6 drives the imaging element 3 in response to the imaging command, and causes the imaging element 3 to perform imaging.

A main memory 9 that stores setting information or the like, a storage unit 10 that includes a storage medium such as a memory card which stores image data generated by the signal processing unit 7, and a display unit 11 that includes a display panel such as a liquid crystal display panel which displays menus and the image data generated by the signal processing unit 7 are provided in the digital camera 1.

The imaging element 3, the AF processing unit 4, the control unit 6, the signal processing unit 7, the main memory 9, the storage unit 10, and the display unit 11 are connected to one another through a control bus 12 and a data bus 13.

The digital camera 1 further includes a shake detection unit 14 that detects the shake of the digital camera 1, and an image shake correction device 15 that corrects image shake on an image reception surface of the imaging element 3 due to the shake of the digital camera 1.

For example, the shake detection unit 14 includes an angular velocity sensor that detects angular velocities around an X axis (pitch axis) and a Y axis (yaw axis) perpendicular to an optical axis (Z axis) of the imaging optical system 2, and detects, as the shake of the digital camera 1, rotation shake amounts around the X axis and the Y axis acquired by performing integration on outputs of the angular velocity sensor.

The image shake correction device 15 includes an image shake correction lens 2b that is built in the imaging optical system 2, a driving unit 20 that moves the image shake correction lens 2b within a plane perpendicular to the optical axis, and a detection unit 21 that detects a position of the image shake correction lens 2b.

The control unit 6 acquires a movement amount of the image shake correction lens 2b that offsets the image shake caused by the rotation shake depending on the rotation shake amounts around the X axis and the Y axis detected by the shake detection unit 14. The control unit 6 controls the driving unit 20 to move the image shake correction lens 2b to a target position by referring to the position of the image shake correction lens 2b detected by the detection unit 21. Accordingly, the image shake is corrected.

FIGS. 3 to 6 show a configuration of the image shake correction device 15.

Figure 3:
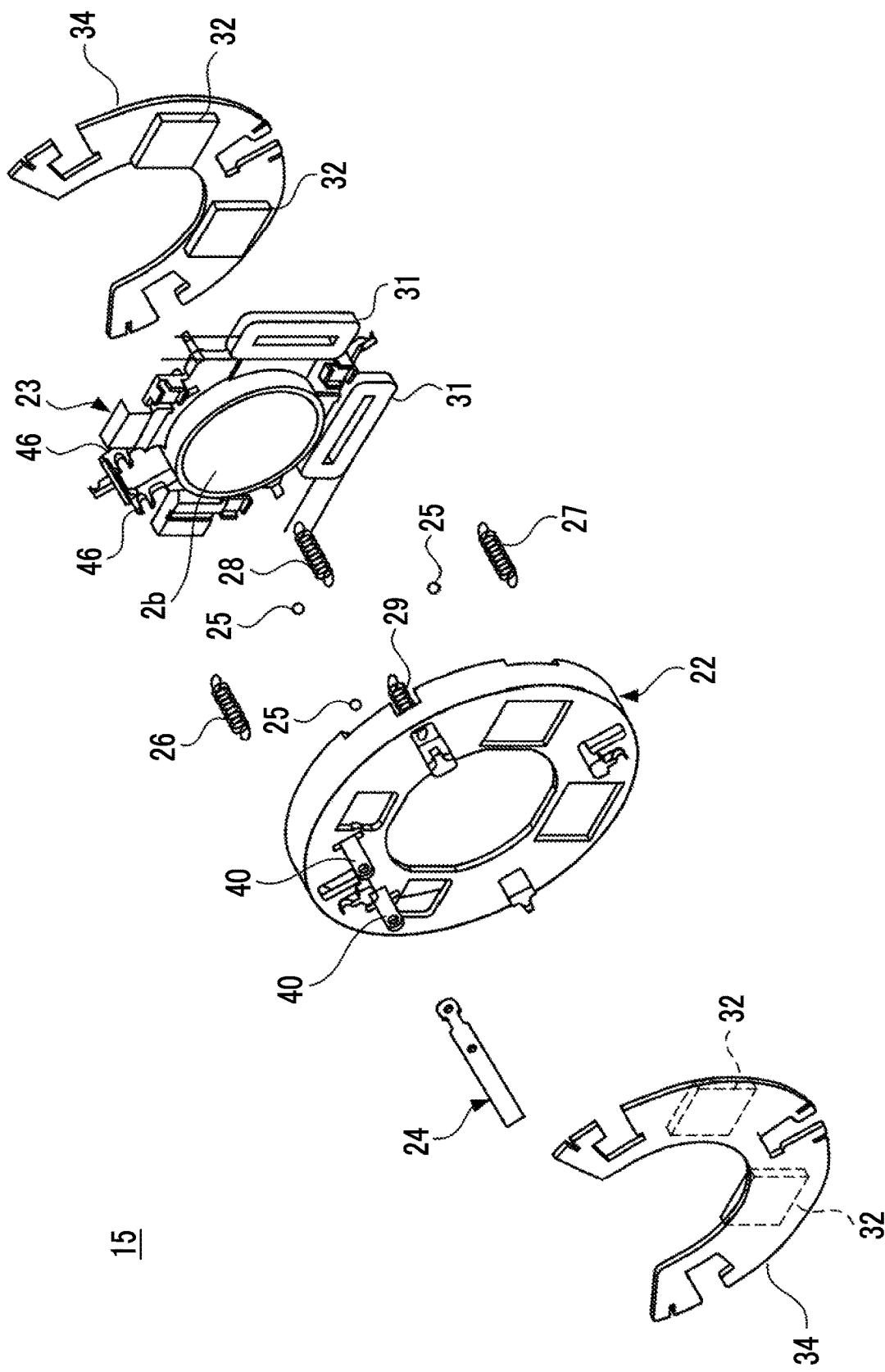
FIG. 3 is an exploded perspective view of the image shake correction device of the imaging device of FIG. 1.

As shown in FIG. 3, the image shake correction device 15 further includes a base member 22, a lens frame 23 that holds the image shake correction lens 2b, and a bracket 24 that guides the movement of the lens frame 23 within a plane perpendicular to the optical axis of the image shake correction lens 2b and regulates the rotation of the lens frame 23 around the optical axis or an axis parallel to the optical axis.

Three balls 25 are arranged between the base member 22 and the lens frame 23, and the lens frame 23 is mounted on the base member 22 so as to be movable within the plane perpendicular to the optical axis.

The lens frame 23 mounted on the base member 22 is moored to the base member 22 so as to be movable within the plane perpendicular to the optical axis in a state in which the rising of the lens frame from the base member 22 is suppressed by a plurality of expandable and contractible mooring members. A total of four mooring members of a first mooring member 26, a second mooring member 27, a third mooring member 28, and a fourth mooring member 29 are used as the mooring members, and these mooring members are coil springs in the illustrated example.

The driving unit 20 that drives the lens frame 23 which holds the image shake correction lens 2b includes two voice coil motors which respectively include a pair of magnets 32 arranged so as to face each other in an optical axis direction with a coil 31 and a coil 31 interposed therebetween in the illustrated example. The detection unit 21 that detects the position of the lens frame 23 which holds the image shake correction lens 2b includes two combinations of magnets 33 and hall elements by using a magnet 33 (see FIG. 5) and a hall element (not shown) which detects a magnetic field formed by the magnet.

One voice coil motor moves the lens frame 23 in one direction of two directions perpendicular to each other within the plane perpendicular to the optical axis, and the position of the lens frame 23 in the same direction is detected by one combination of the magnet 33 and the hall element. The other voice coil motor moves the lens frame 23 in the other direction of the two directions, and the position of the lens frame 23 in the same direction is detected by the other combination of the magnet 33 and the hall element.

The coils 31 of the voice coil motor are held by the lens frame 23. The pair of magnets 32 of the voice coil motors are fixed to yokes 34 made of a steel plate or the like, and are held by the base member 22.

Figure 4:
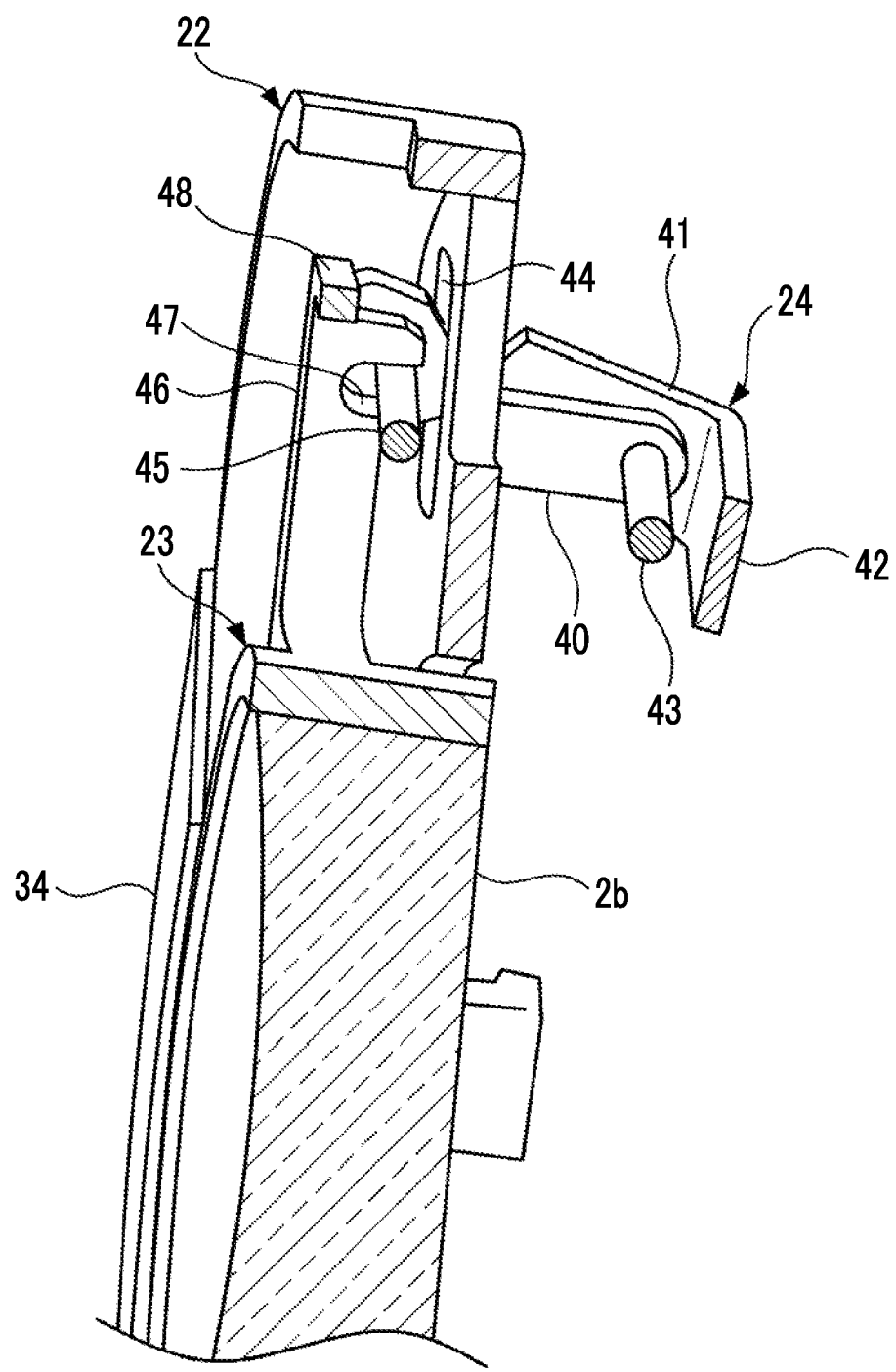
FIG. 4 is an enlarged perspective view of main parts of the image shake correction device of FIG. 3.
Figure 5:
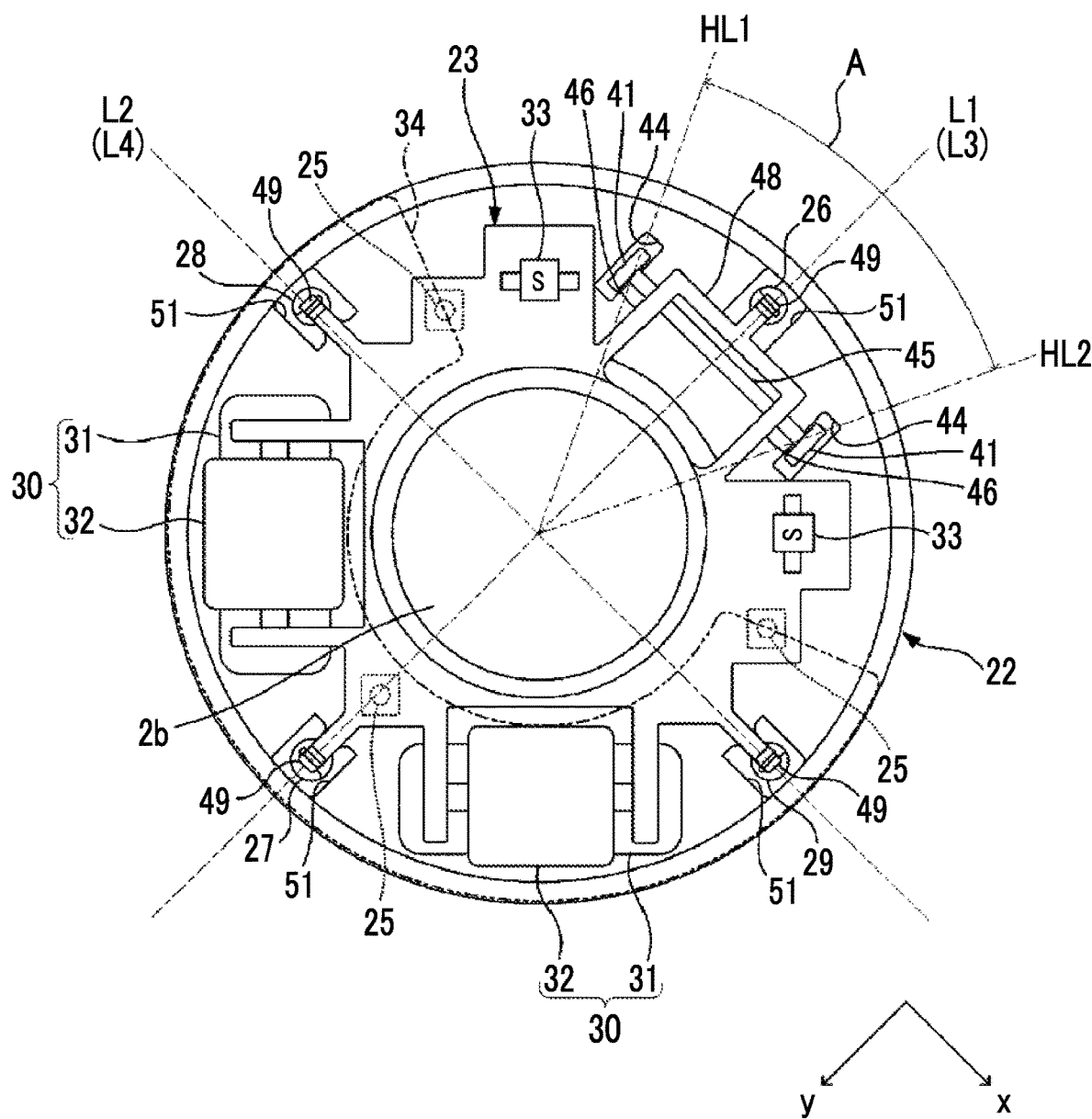
FIG. 5 is a plan view of the image shake correction device of FIG. 3.

Referring to FIGS. 4 and 5, a pair of support arms 40 arranged at a distance in one direction (hereinafter, referred to an x direction) within a plane on which the lens frame 23 moves on a rear surface opposite to a mount surface of the base member 22 on which the lens frame 23 is mounted is arranged.

The bracket 24 includes a pair of swing arms 41 that interposes a pair of support arms 40 of the base member 22 interposed therebetween and a bridge 42 that connects one-side end portions of the pair of swing arms 41.

A first shaft member 43 penetrates base ends of the pair of swing arms 41 connected to each other by the bridge 42 and the pair of support arms 40 interposed between the pair of swing arms 41 in parallel with the x direction within the plane on which the lens frame 23 moves. The bracket 24 is supported by the base member 22 so as to be swingable around the first shaft member 43.

Distal ends of the pair of swing arms 41 pass through through-holes 44 formed in the base member 22, and are arranged so as to protrude from the mount surface of the base member 22. A second shaft member 45 is bridged in parallel with the first shaft member 43, that is, in parallel with the x direction between the distal ends of the pair of swing arms 41. The second shaft member 45 functions as a guide portion that guides the movement of the lens frame 23 within the plane perpendicular to the optical axis.

The lens frame 23 includes a pair of engagement arms 46 as a first engagement portion and a second engagement portion that engage with the second shaft member 45 of the bracket 24. The pair of engagement arms 46 is arranged at a distance in the x direction, and cutout portions 47 are respectively formed in the pair of engagement arms 46. The cutout portions 47 extend in the optical axis direction, and are opened to the mount surface of the base member 22.

In a case where the lens frame 23 is mounted on the base member 22, the second shaft member 45 is accommodated in the cutout portions 47 of the pair of engagement arms 46, and the pair of engagement arms 46 engages with the second shaft member 45 so as to be detachably attached in the optical axis direction.

The pair of engagement arms 46 which accommodates the second shaft member 45 in the cutout portions 47 and engages with the second shaft members 45 is able to move along the second shaft member 45, and the lens frame 23 is guided in the x direction which is the extending direction of the second shaft member 45.

The pair of engagement arms 46 is able to rotationally move with respect to the second shaft member 45 around the second shaft member 45, and the lens frame 23 is guided in a y direction which is the movement direction of the second shaft member 45 due to the swing of the bracket 24 and is perpendicular to the x direction within the plane on which the lens frame 23 moves with the swing around the first shaft member 43 of the bracket 24.

The pair of engagement arms 46 engages with two portions of the second shaft member 45 which are spaced apart in the longitudinal direction of the second shaft member 45, and thus, the rotation of the lens frame 23 around the optical axis or the axis parallel to the optical axis is suppressed.

In suppressing the rotation of the lens frame 23, the lens frame 23 may engage with the second shaft member 45 while securing the corresponding engagement margin in the longitudinal direction of the second shaft member 45. For example, engagement portions of the lens frame 23 with the second shaft member 45 may be one engagement arm with substantially the same width as a distance between the pair of engagement arms 46.

As shown in FIG. 5, when viewed in the optical axis direction, in a case where it is assumed that a straight line passing through the optical axis and the center of the second shaft member 45 in the longitudinal direction is a first straight line L1 and a straight line which is perpendicular to the first straight line L1 and passes through the optical axis is a second straight line L2, the second shaft member 45 and the pair of engagement arms 46 are arranged on a side opposite to the two voice coil motors 30 with the second straight line L2 interposed therebetween.

The first mooring member 26 of the plurality of mooring members is formed so as to be adjacent to the second shaft member 45 and the pair of engagement arms 46. In the illustrated example, distal ends of the pair of engagement arms 46 are connected to each other through a bridge 48. A one-side end of the first mooring member 26 is locked by a locking portion 49 formed at the bridge 48, and the other-side end thereof is locked by the base member 22. The first mooring member 26 is formed so as to be adjacent to the second shaft member 45 and the pair of engagement arms 46.

When viewed in the optical axis direction, in a case where it is assumed that a straight line passes through the first mooring member 26 and the optical axis is a third straight line L3, the second mooring member 27 is arranged on the third straight line L3 and is arranged on a side opposite to the first mooring member 26 with the second straight line L2 interposed therebetween.

When viewed in the optical axis direction, in a case where it is assumed that a straight line which is perpendicular to the third straight line L3 and passes through the optical axis is a fourth straight line L4, the third mooring member 28 and the fourth mooring member 29 are arranged on the fourth straight line L4 and are arranged on sides opposite to each other with the third straight line L3 interposed therebetween.

The lens frame 23 holds the coils 31 of the two voice coil motors 30, and a weight distribution of the lens frame 23 is biased to a side on which the two voice coil motors 30 are arranged on one side of the second straight line L2. A side of the lens frame 23 on which the two voice coil motors 30 are arranged is covered by the yoke 34, whereas a side of the lens frame 23 on which the pair of engagement arms 46 is arranged is opened. Thus, in a case where vibration or impact is applied, the side of the lens frame 23 on which the pair of engagement arms 46 is arranged easily rises up from the base member 22.

However, the first mooring member 26 is formed so as to be adjacent to the second shaft member 45 and the pair of engagement arms 46, and contractile force of the first mooring member 26 is applied to the lens frame 23 near the second shaft member 45 and the pair of engagement arms 46. Thus, the rising of the side of the lens frame 23 on which the pair of engagement arms 46 is arranged is effectively suppressed. Accordingly, the separation of the pair of engagement arms 46 from the second shaft member 45 is suppressed.

Preferably, when viewed in the optical axis direction, the first mooring member 26 is arranged within a fan-like region A between a half straight line HL1 which extends to a one-side end of the second shaft member 45 from the optical axis and a half straight line HL2 which extends to the other-side end of the second shaft member 45 from the optical axis. More preferably, the first mooring member is arranged on the first straight line L1 which passes through the optical axis and the center of the second shaft member 45 in the longitudinal direction as in the illustrated example. Accordingly, the rising of the side of the lens frame 23 on which the pair of engagement arms 46 is arranged is more effectively suppressed. In a case where the first mooring member 26 is arranged on the first straight line L1, the third straight line L3 matches the first straight line L1, and the fourth straight line L4 matches the second straight line L2.

The second mooring member 27 is arranged on the third straight line L3 and is arranged on the side opposite to the first mooring member 26 with the second straight line L2 interposed therebetween. Thus, the contractile forces of the first mooring member 26 and the second mooring member 27 are substantially equally loaded to the lens frame 23 with the optical axis as a center, and the rising of the side of the lens frame 23 on which the two voice coil motors 30 are arranged is more effectively suppressed.

As in the illustrated example, preferably, the third mooring member 28 and the fourth mooring member 29 are arranged on the fourth straight line L4 and are arranged on the sides opposite to each other with the third straight line L3 interposed therebetween. As a result, it is possible to further stabilize the lens frame 23.

Here, the first mooring member 26, the second mooring member 27, the third mooring member 28, and the fourth mooring member 29 which prevent the rising of the lens frame 23 are arranged substantially in parallel with the optical axis. However, the lens frame 23 moves within the plane perpendicular to the optical axis, and thus, these mooring members tilt with respect to the optical axis. In a case where the first mooring member 26, the second mooring member 27, the third mooring member 28, and the fourth mooring member 29 tilt with respect to the optical axis, components of the contractile forces of the mooring members are generated within the movement plane of the lens frame 23, and the components of the contractile forces within the movement plane may become noise in controlling the driving unit 20 that moves the lens frame 23.

Figure 6:
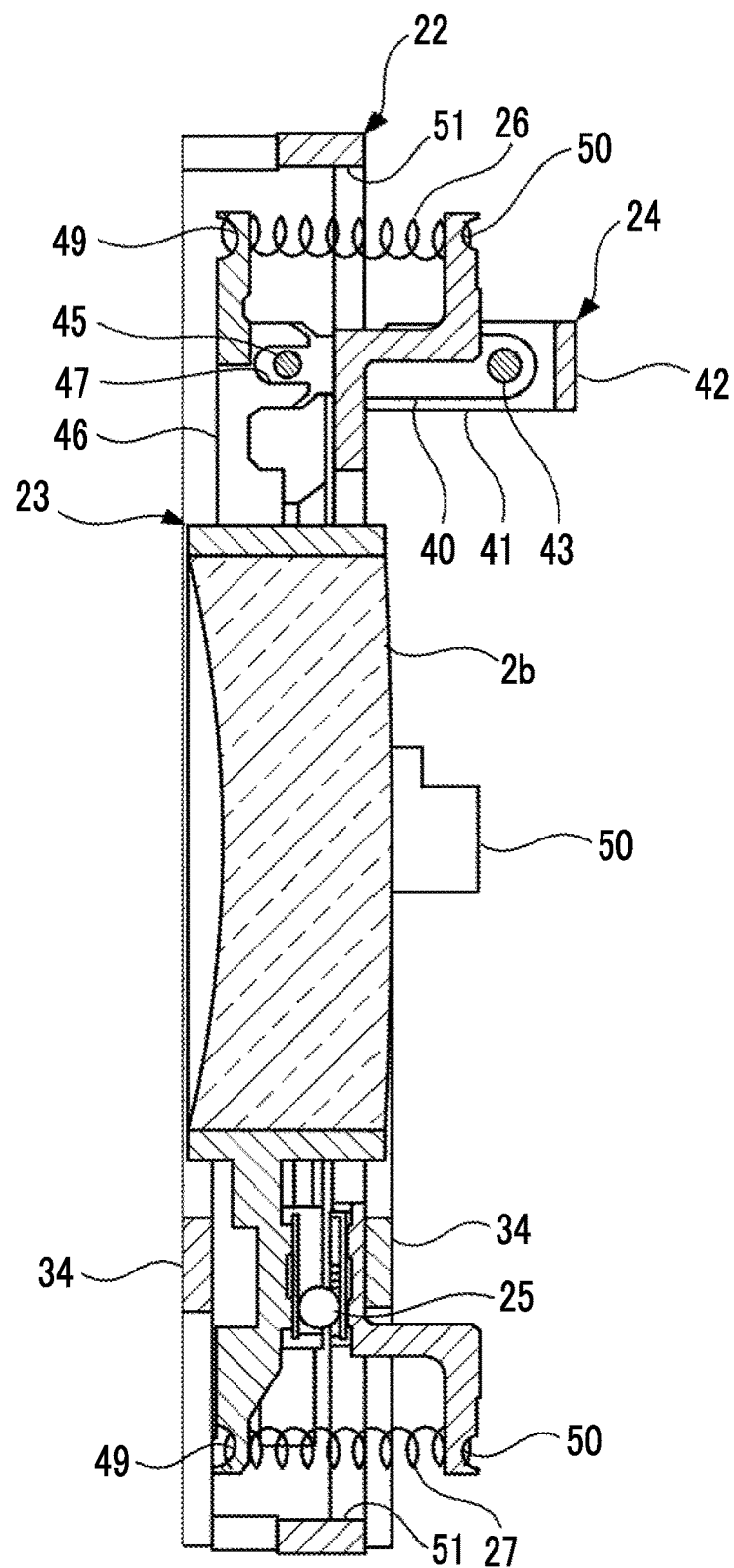
FIG. 6 is a sectional view of the image shake correction device of FIG. 3.

As shown in FIG. 6, a locking portion 50 of the base member 22 that locks one-side ends of the first mooring member 26, the second mooring member 27, the third mooring member 28, and the fourth mooring member 29 is formed so as to protrude from the rear surface of the base member 22 in the optical axis direction. The first mooring member 26, the second mooring member 27, the third mooring member 28, and the fourth mooring member 29 pass through through-holes 51 of the base member 22, and are bridged between the locking portion 50 of the base member 22 and the locking portion 49 of the lens frame 23.

The locking portion 50 of the base member 22 is formed so as to protrude from the rear surface of the base member 22 in the optical axis direction. Thus, it is possible to lengthen the first mooring member 26, the second mooring member 27, the third mooring member 28, and the fourth mooring member 29, and tilts of the mooring members with respect to the optical axis with the movement of the lens frame 23 are reduced. Accordingly, it is possible to reduce the components included in the contractile forces of the mooring members within the movement plane of the lens frame 23. Therefore, it is possible to increase control stabilization by suppressing noise in controlling the driving unit 20.

Preferably, the bridge 42 of the bracket 24 that connects the base ends of the pair of engagement arms 46 on the rear surface of the base member 22 is arranged so as to be further away from the rear surface of the base member 22 than the locking portion 50 of the base member 22 which locks the one-side end of the first mooring member 26. Accordingly, interference of the bridge 42 and the first mooring member 26 is avoided, and thus, the first mooring member 26 can approach the second shaft member 45 and the pair of engagement arms 46. Therefore, it is possible to more effectively suppress the rising of the lens frame 23.

Figure 7:
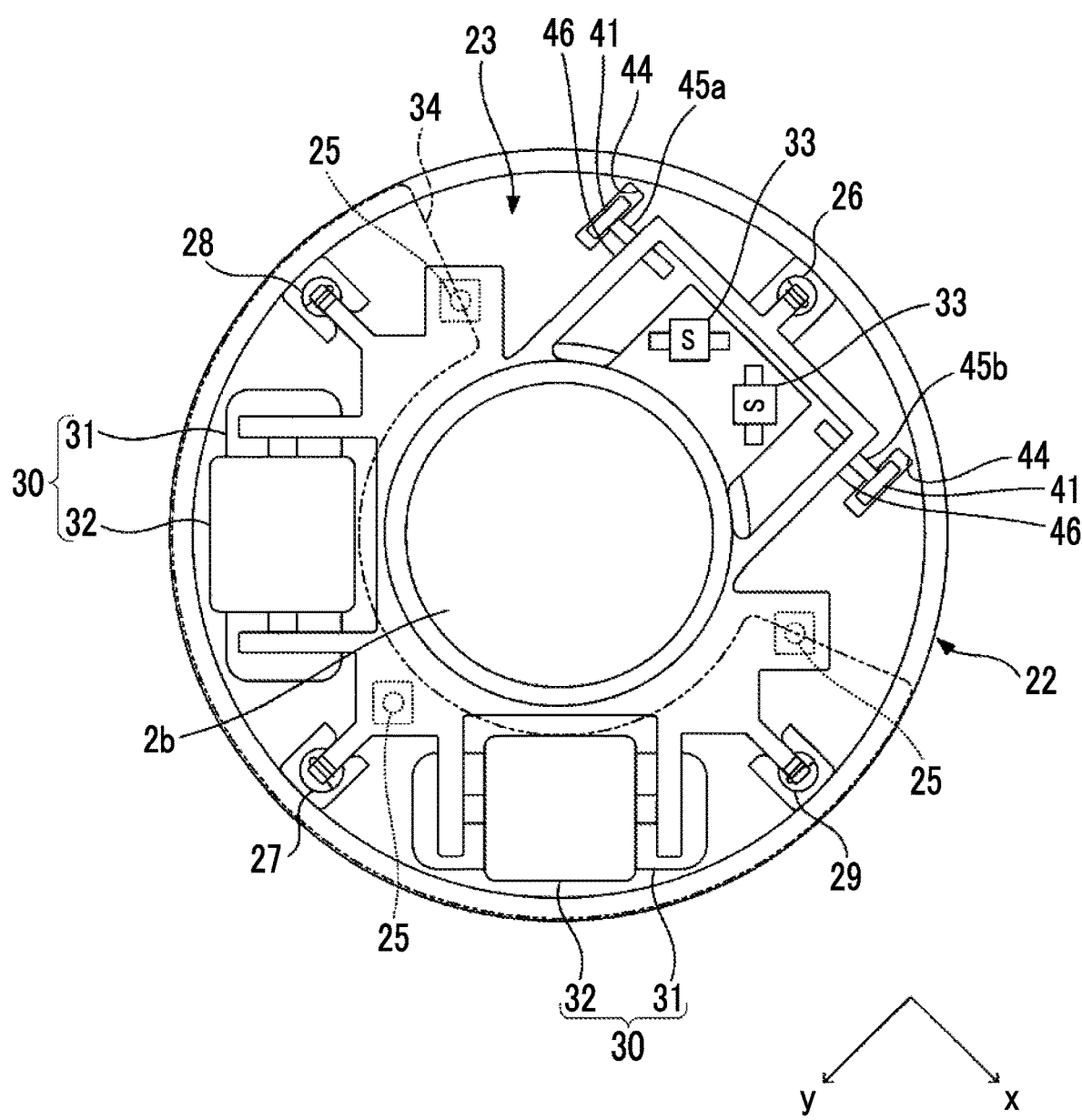
FIG. 7 is a plan view of a modification example of the image shake correction device of FIG. 3.

FIG. 7 shows a configuration of a modification example of the image shake correction device 15.

Although it has been described in the image shake correction device 15 that the guide portion of the bracket 24 with which the pair of engagement arms 46 of the lens frame 23 engages is the continuous second shaft member 45 bridged between the pair of swing arms 41, the guide portion of the bracket 24 includes a shaft member 45a as a first guide portion formed on one swing arm 41 and a shaft member 45b as a second guide portion formed at the other swing arm 41, in the example shown in FIG. 7. The shaft member 45a and the shaft member 45b are arranged on the same axis parallel to the x direction.

The guide portion of the bracket 24 is divided into the shaft member 45a and the shaft member 45b so as to correspond to the pair of engagement arms 46 separated with each other, and thus, the shaft member 45a and one engagement arm 46 which engages with the shaft member 45a are spaced apart from the shaft member 45b and the other engagement arm 46 which engages with the shaft member 45b. In the example shown in FIG. 7, the detection unit 21 (two combinations of the magnets 33 and the hall elements) that detects the position of the lens frame 23 is arranged in such space.

The detection unit 21 is arranged in the space, and thus, a new space is formed outside the pair of swing arms 41 along an axis at which the shaft member 45a and the shaft member 45b are arranged. Accordingly, the distance between the pair of swing arms 41 is widened, and thus, the shaft member 45a and one engagement arm 46 which engages with the shaft member 45a can be further spaced apart from the shaft member 45b and the other engagement arm 46 which engages with the shaft member 45b. Therefore, it is possible to further suppress the rotation of the lens frame 23 around the optical axis or the axis parallel to the optical axis.

Figure 8:
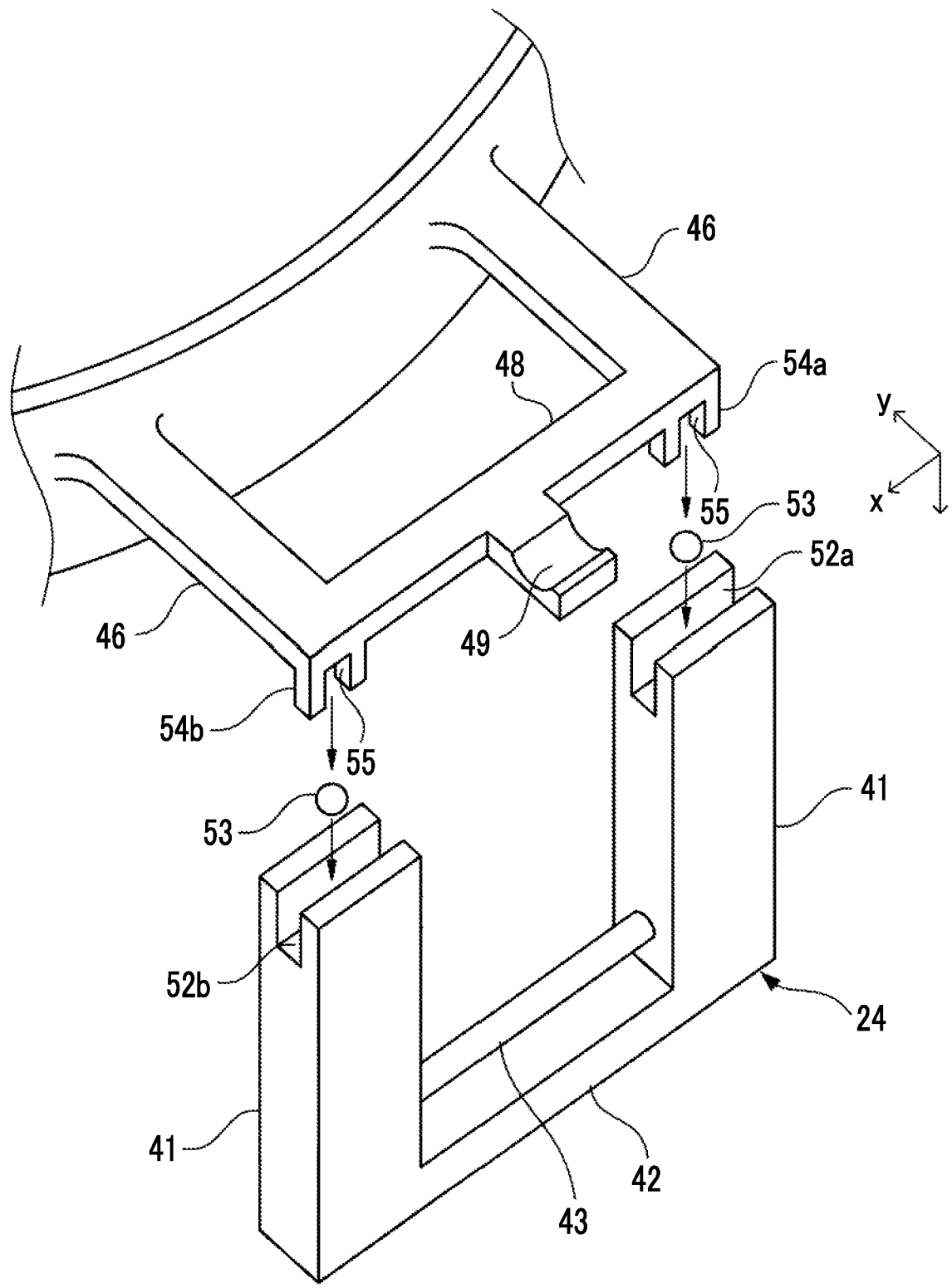
FIG. 8 is an enlarged perspective view of main parts of another modification example of the image shake correction device of FIG. 3.

FIG. 8 shows a configuration of another modification example of the image shake correction device 15.

In the example shown in FIG. 8, the guide portion of the bracket 24 includes a guide groove 52a as the first guide portion formed in one swing arm 41 and a guide groove 52b as the second guide portion formed in the other swing arm 41. The guide groove 52a and the guide groove 52b are formed on the same axis parallel with the x direction, and extend along the axis. Balls 53 are accommodated in the guide groove 52a and the guide groove 52b. The balls 53 are brought slidably into contact with the inner surfaces of the guide grooves, and are able to move in an extending direction (x direction) of the grooves and a depth direction of the groove within the guide grooves.

Engagement protrusion portion 54a to be fit into the guide groove 52a is formed in one engagement arm 46 of the lens frame 23, and a slot 55 which pinches the ball 53 accommodated in the guide groove 52a in the groove in the extending direction (x direction) is formed in the engagement protrusion portion 54a. Similarly, an engagement protrusion portion 54b to be fit into the guide groove 52b is formed in the other engagement arm 46, and a slot 55 which pinches the ball 53 accommodated in the guide groove 52b in the groove in the extending direction (x direction) is formed in the engagement protrusion portion 54b.

In a case where the lens frame 23 is mounted on the base member 22, the engagement protrusion portion 54a and the engagement protrusion portion 54b are fit into the guide groove 52a and the guide groove 52b, and the pair of engagement arms 46 engages with the guide groove 52a and the guide groove 52b so as to be detachably attached in the optical axis direction.

The pair of engagement arms 46 is guided in the x direction which is the extending direction of the guide groove 52a and the guide groove 52b by bringing the balls 53 pinched in the slots 55 of the engagement protrusion portion 54a and the engagement protrusion portion 54b slidably into contact with the inner surfaces of the guide groove 52a and the guide groove 52b.

The pair of engagement arms 46 is able to rotationally move with respect to the guide groove 52a and the guide groove 52b around an axis passing through the two balls 53 pinched in the slots 55 of the engagement protrusion portion 54a and the engagement protrusion portion 54b, and the lens frame 23 is guided in the y direction which is the movement direction of the guide groove 52a and the guide groove 52b due to the swing of the bracket 24 with the swing of the bracket 24 around the first shaft member 43.

The pair of engagement arms 46 engages with the guide groove 52a and the guide groove 52b separated with each other, and thus, the rotation of the lens frame 23 around the optical axis or the axis parallel to the optical axis is suppressed.

Although it has been described above that the digital camera 1 is used as the imaging device, an example in which a smartphone with a camera is used as the imaging device will be described below.

Figure 9:
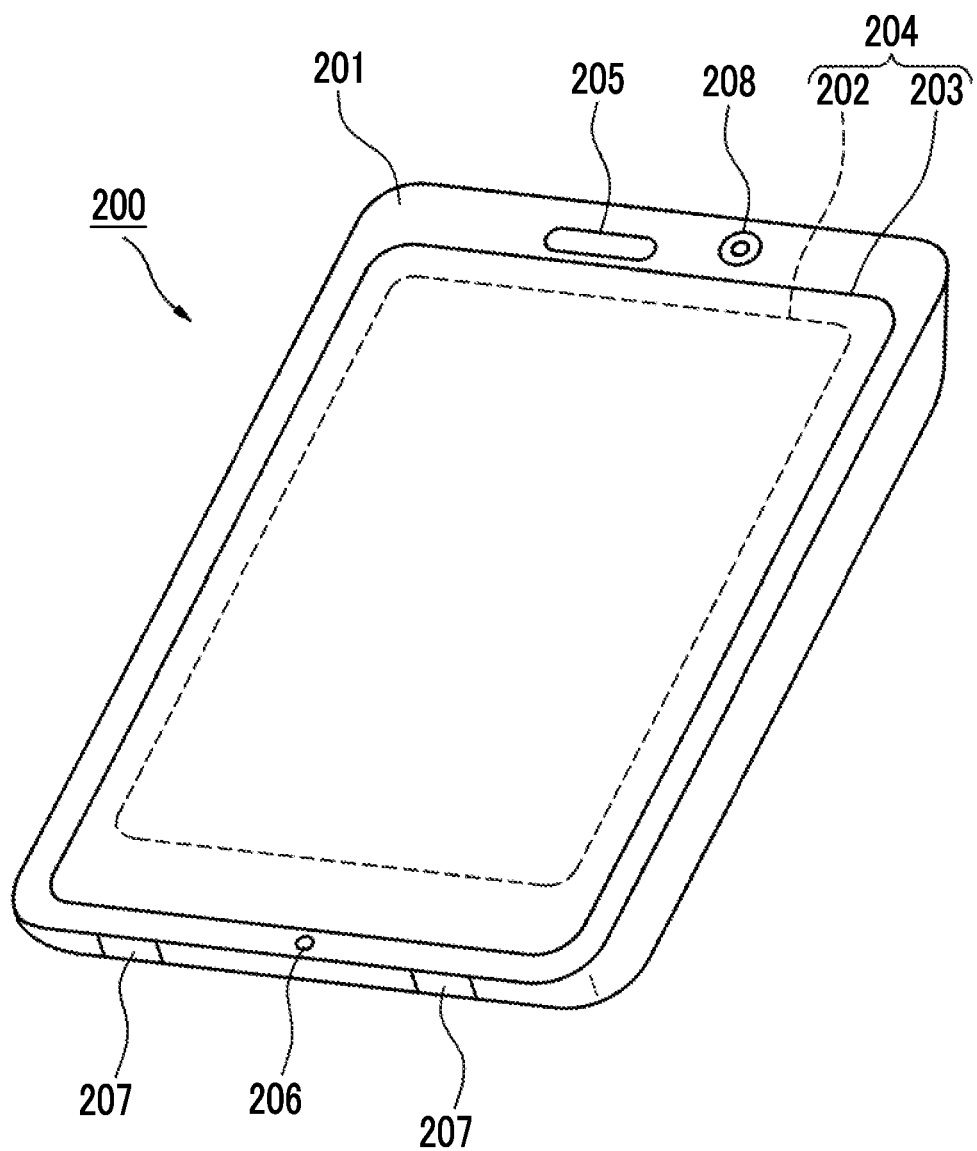
FIG. 9 is a perspective view of an example of the imaging device for describing the embodiment of the present invention.

FIG. 9 shows an external appearance of a smartphone 200 which is an embodiment of the imaging device of the present invention.

The smartphone 200 shown in FIG. 9 has a flat-shaped casing 201, and includes a display input unit 204 in which a display panel 202 as a display unit and an operation panel 203 as an input unit are integrally formed on one surface of the casing 201. Such a casing 201 includes a speaker 205, a microphone 206, an operating unit 207, and a camera unit 208. The configuration of the casing 201 is not limited thereto, and may be, for example, a configuration in which the display unit and the input unit are independently provided, or may be a folding structure or a configuration in which a sliding mechanism is provided.

FIG. 10 shows a configuration of the smartphone 200 shown in FIG. 9.

As shown in FIG. 10, the smartphone includes, as main components, a wireless communication unit 210, the display input unit 204, a call handling unit 211, the operating unit 207, the camera unit 208, a storage unit 212, an external input and output unit 213, a global positioning system (GPS) reception unit 214, a motion sensor unit 215, a power supply unit 216, and a main control unit 220. The smartphone 200 has, as a main function, a wireless communication function of performing mobile radio communication through a base station apparatus BS (not shown) and a mobile communication network NW (not shown).

The wireless communication unit 210 performs wireless communication with the base station apparatus BS belonging to the mobile communication network NW according to an instruction of the main control unit 220. The transmission and reception of various file data items such as voice data and image data or electronic mail data or the reception of Web data, streaming data, or the like are performed through the wireless communication.

The display input unit 204 is a so-called touch panel that displays image (still image or moving image), character information, or the like, visually delivers information to the user under the control of the main control unit 220, and detects a user operation on the displayed information. The display input unit includes the display panel 202 and the operation panel 203.

The display panel 202 uses a liquid crystal display (LCD), an organic electro-luminescence display (OELD), or the like, as a display device.

The operation panel 203 is a device that is mounted such that an image displayed on a display surface of the display panel 202 is visually perceived, and detects one or a plurality of coordinates operated with a finger of the user or a stylus. In a case where the device is operated with a finger of the user or a stylus, a detection signal generated by the operation is output to the main control unit 220. Subsequently, the main control unit 220 detects an operation position (coordinates) on the display panel 202 based on the received detection signal.

As shown in FIG. 9, although it has been described that the display panel 202 and the operation panel 203 of the smartphone 200 illustrated as the embodiment of the imaging device of the present invention are integrally formed and constitute the display input unit 204, the operation panel 203 is arranged so as to completely cover the display panel 202.

In a case where such an arrangement is adopted, the operation panel 203 may have a function of detecting the user operation in a region other than the display panel 202. In other words, the operation panel 203 may have a detection region (hereinafter, referred to as a display region) for an overlapped portion which overlaps with the display panel 202 and a detection region (hereinafter, referred to a non-display region) for an outer edge portion which does not overlap with the display panel 202.

The size of the display region and the size of the display panel 202 may completely match each other, and it is not necessary to match both the sizes. The operation panel 203 may have the outer edge portion and two sensitive regions which are inner portions other than the outer edge portion. The width of the outer edge portion is appropriately designed depending on the size of the casing 201 or the like. The position detection method adopted in the operation panel 203 includes a matrix switch method, a resistance film method, a surface acoustic wave method, an infrared method, an electromagnetic induction method, an electrostatic capacity method, and the like, and any one method may be adopted.

The call handling unit 211 includes the speaker 205 or the microphone 206. The call handling unit converts the voice of the user input through the microphone 206 into voice data capable of being processed by the main control unit 220, and outputs the converted voice data to the main control unit 220. The call handling unit decodes the voice data received by the wireless communication unit 210 or the external input and output unit 213, and outputs the decoded voice data through the speaker 205. For example, as shown in FIG. 9, the speaker 205 may be mounted on the same surface as the surface on which the display input unit 204 is provided, and the microphone 206 may be mounted on a side surface of the casing 201.

The operating unit 207 is a hardware key using a key switch or the like, and receives an instruction from the user. For example, as shown in FIG. 9, the operating unit 207 is mounted on the side surface of the casing 201 of the smartphone 200, and is a push button type switch which is turned on in a case where the user pushes the switch with the finger or the like and is turned off by restoration force of a spring or the like in a case where the user takes their finger off the switch.

The storage unit 212 stores a control program or control data of the main control unit 220, application software, address data associated with a name or a telephone number of a communication partner or the like, data of a transmitted or received electronic mail, Web data downloaded through Web browsing, or downloaded content data, and temporarily stores streaming data or the like. The storage unit 212 includes an internal storage unit 217 built in the smartphone, and an external storage unit 218 for a detachably attached external memory slot. The internal storage unit 217 and the external storage unit 218 constituting the storage unit 212 is realized by a storage medium such as a flash memory type memory, a hard disk type memory, a multimedia card micro type memory, a card type memory (for example, a micro SD (registered trademark) memory), a random access memory (RAM), or a read only memory (ROM).

The external input and output unit 213 serves as an interface with all external devices connected to the smartphone 200, and is directly or indirectly connected to other external devices through communication (for example, universal serial bus (USB), IEEE 1394, or the like), or a network (for example, Internet, wireless LAN, Bluetooth (registered trademark), radio frequency identification (RFID), Infrared Data association (IrDA) (registered trademark), ultra wideband (UWB) (registered trademark), Zig-Bee (registered trademark), or the like).

Examples of the external device to be connected to the smartphone 200 includes a wired or wireless headset, an external wired or wireless charger, a wired or wireless data port, a memory card to be connected through a card socket, a subscriber identity module (SIM) card, or a user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, a PDA to be connected in a wired or wireless manner, an earphone to be connected in a wired or wireless manner, or the like. The external input and output unit 213 can transfer data transmitted from the external devices to the respective components in the smartphone 200 or can transmit data in the smartphone 200 to the external devices.

The GPS reception unit 214 receives GPS signals transmitted from GPS satellites ST1 to STn according to an instruction of the main control unit 220, performs positioning calculation processing based on a plurality of received GPS signals, and detects the position of the smartphone 200 having latitude, longitude, and altitude. In a case where positional information can be acquired from the wireless communication unit 210 or the external input and output unit 213 (for example, a wireless LAN), the GPS reception unit 214 can detect the position using the positional information.

For example, the motion sensor unit 215 includes a three-axis acceleration sensor or the like, and detects physical motion of the smartphone 200 according to an instruction of the main control unit 220. The moving direction or acceleration of the smartphone 200 is detected by detecting the physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling the respective units of a communication system in order to perform voice communication or data communication through the wireless communication unit 210, and an application processing function.

The application processing function is realized by the main control unit 220 operating according to application software stored in the storage unit 212. The application processing function is, for example, an infrared communication function of controlling the external input and output unit 213 to perform data communication with a device facing the smartphone 200, an electronic mail function of transmitting and receiving electronic mails, a Web browsing function of browsing Web pages, or the like.

The main control unit 220 has an image processing function of displaying video on the display input unit 204 or the like based on image data (still image or moving image data), such as received data or downloaded streaming data. The image processing function refers to a function of the main control unit 220 decoding the image data, performing image processing on the decoding result, and displaying an image on the display input unit 204.

The main control unit 220 performs display control on the display panel 202 and operation detection control for detecting a user operation through the operating unit 207 and the operation panel 203. Through the performing of the display control, the main control unit 220 displays an icon for activating application software or a software key, such as a scroll bar, or displays a window for creating electronic mails. The scroll bar refers to a software key for receiving an instruction to move a display portion of an image which is too large to fit into the display area of the display panel 202.

Through the performing of the operation detection control, the main control unit 220 detects the user operation through the operating unit 207, receives an operation on the icon or an input of a character string in an input field of the window through the operation panel 203, or receives a scroll request of a display image through the scroll bar.

Through the performing of the operation detection control, the main control unit 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration of the imaging optical system 2, the imaging element 3, the AF processing unit 4, the control unit 6, the signal processing unit 7, the main memory 9, the shake detection unit 14, and the image shake correction device 15 in the digital camera 1, and has a configuration in which the image shake on the image reception surface of the imaging element 3 due to the shake of the smartphone 200 is able to be corrected.

Image data generated by the camera unit 208 can be recorded in the storage unit 212 or can be output through the external input and output unit 213 or the wireless communication unit 210.

Although it has been described in the smartphone 200 shown in FIG. 9 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS reception unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a moving image may be attached with positional information acquired by the GPS reception unit 214, voice information (which may be converted to text information through voice-text conversion by the main control unit or the like) acquired by the microphone 206, posture information acquired by the motion sensor unit 215, or the like and can be recorded in the storage unit 212, or may be output through the external input and output unit 213 or the wireless communication unit 210.

Although it has been described above that the digital camera 1 or the smartphone 200 with an integrated lens is used as the imaging device including the image shake correction device, a lens device including the image shake correction device which is a lens device detachably attached to a lens-interchangeable digital camera may be used.

As described above, an image shake correction device disclosed in the present specification comprises a base member, a lens frame that holds an image shake correction lens, and is mounted on the base member so as to be movable in a first direction and a second direction perpendicular to the first direction within a plane perpendicular to an optical axis of the image shake correction lens, a plurality of expandable and contractible mooring members that moors the lens frame to the base member such that the lens frame is able to move in the first direction and the second direction, a bracket that is supported by the base member so as to be swingable around a first axis parallel to the first direction, and a driving unit that drives the lens frame in the first direction and the second direction. The bracket has a guide portion arranged on a second axis parallel to the first direction. The lens frame has an engagement portion which engages with the guide portion so as to be movable along the second axis, to be relatively rotatable around the second axis, and to be detachably attached in an optical axis direction. The guide portion and the engagement portion are arranged on a side opposite to the driving unit while interposing a second straight line which is perpendicular to a first straight line passing through the optical axis and a center of the guide portion on the second axis and passes through the optical axis when viewed in the optical axis direction. A first mooring member that is formed so as to be adjacent to the guide portion and the engagement portion and a second mooring member that is arranged on a third straight line passing through the first mooring member and the optical axis and is arranged on a side opposite to the first mooring member with the second straight line interposed therebetween when viewed in the optical axis direction are included as the plurality of mooring members.

In the image shake correction device disclosed in the present specification, the first mooring member is arranged within a fan-like region between a half straight line which extends from the optical axis to a one-side end of the guide portion on the second axis and a half straight line which extends from the optical axis to the other-side end of the guide portion on the second axis when viewed in the optical axis direction.

The image shake correction device disclosed in the present specification further comprises a third mooring member and a fourth mooring member which are arranged on a fourth straight line which is perpendicular to the third straight line and passes through the optical axis and are arranged on sides opposite to each other with the third straight line interposed therebetween when viewed in the optical axis direction, as the plurality of mooring members.

In the image shake correction device disclosed in the present specification, the base member includes a plurality of locking portions which locks one-side ends of the plurality of mooring members, and the locking portions are formed so as to protrude from a rear surface of the base member on a side opposite to a mount surface on which the lens frame is mounted in the optical axis direction.

In the image shake correction device disclosed in the present specification, the bracket includes a pair of arms which is bridged between the first axis and the second axis and a bridge which connects the pair of arms, and the bridge is arranged so as to be further away from the rear surface of the base member than the locking portion which locks the one-side end of the first mooring member.

In the image shake correction device disclosed in the present specification, the guide portion includes a first guide portion formed on one of the arms and a second guide portion formed on other of the arms, the engagement portion includes a first engagement portion which engages with the first guide portion and a second engagement portion which engages with the second guide portion, and the first guide portion and the first engagement portion are spaced apart from the second guide portion and the second engagement portion.

A lens device disclosed in the present specification comprises the image shake correction device.

An imaging device disclosed in the present specification comprises the image shake correction device.

The present invention may be used in various electronic devices which image images.

Although the invention has been described above by a specific embodiment, the invention is not limited to the embodiment, and various modifications may be made without departing from the technical spirit of the invention disclosed herein.

What is claimed is:

1. An image shake correction device comprising:
    a base member;
    a lens frame that holds an image shake correction lens, and is mounted on the base member so as to be movable in a first direction and a second direction perpendicular to the first direction within a plane perpendicular to an optical axis of the image shake correction lens;
    a plurality of expandable and contractible mooring members that moors the lens frame to the base member such that the lens frame is able to move in the first direction and the second direction;
    a bracket that is supported by the base member so as to be swingable around a first axis parallel to the first direction;
    a driving unit that drives the lens frame in the first direction and the second direction; and
    a cover that interposes the lens frame between the cover and the base member,
    wherein the bracket has a guide portion arranged on a second axis parallel to the first direction, the lens frame has an engagement portion which engages with the guide portion so as to be movable along the second axis, to be relatively rotatable around the second axis, and to be detachably attached in an optical axis direction, the guide portion and the engagement portion are arranged on a side opposite to the driving unit while interposing a second straight line which is perpendicular to a first straight line passing through the optical axis and a center of the guide portion on the second axis and passes through the optical axis, when viewed in the optical axis direction, a side at which the driving unit is arranged is covered by the cover, whereas a side at which the guide portion and the engagement portion are arranged is opened, while interposing the second straight line, and a first mooring member that is formed so as to be adjacent to the guide portion and the engagement portion and a second mooring member that is arranged on a third straight line passing through the first mooring member and the optical axis and is arranged on a side opposite to the first mooring member with the second straight line interposed therebetween when viewed in the optical axis direction are included as the plurality of mooring members.

2. The image shake correction device according to claim 1, wherein the first mooring member is arranged within a fan-like region between a half straight line which extends from the optical axis to a one-side end of the guide portion on the second axis and a half straight line which extends from the optical axis to an other-side end of the guide portion on the second axis when viewed in the optical axis direction.

3. The image shake correction device according to claim 2, further comprising:

a third mooring member and a fourth mooring member which are arranged on a fourth straight line which is perpendicular to the third straight line and passes through the optical axis and are arranged on sides opposite to each other with the third straight line interposed therebetween when viewed in the optical axis direction, as the plurality of mooring members.

4. The image shake correction device according to claim 3, wherein the base member has a plurality of locking portions which locks one-side ends of the plurality of mooring members, and the locking portions are formed so as to protrude from a rear surface of the base member on a side opposite to a mount surface on which the lens frame is mounted in the optical axis direction.

5. The image shake correction device according to claim 4, wherein the bracket has a pair of arms which is bridged between the first axis and the second axis and a bridge which connects the pair of arms, and the bridge is arranged so as to be further away from the rear surface of the base member than the locking portion which locks the one-side end of the first mooring member.

6. The image shake correction device according to claim 5, wherein the guide portion has a first guide portion formed on one of the arms and a second guide portion formed on other of the arms, the engagement portion has a first engagement portion which engages with the first guide portion and a second engagement portion which engages with the second guide portion, and the first guide portion and the first engagement portion are spaced apart from the second guide portion and the second engagement portion.

7. The image shake correction device according to claim 2, wherein the base member has a plurality of locking portions which locks one-side ends of the plurality of mooring members, and the locking portions are formed so as to protrude from a rear surface of the base member on a side opposite to a mount surface on which the lens frame is mounted in the optical axis direction.

8. The image shake correction device according to claim 7, wherein the bracket has a pair of arms which is bridged between the first axis and the second axis and a bridge which connects the pair of arms, and the bridge is arranged so as to be further away from the rear surface of the base member than the locking portion which locks the one-side end of the first mooring member.

9. The image shake correction device according to claim 8, wherein the guide portion has a first guide portion formed on one of the arms and a second guide portion formed on other of the arms, the engagement portion has a first engagement portion which engages with the first guide portion and a second engagement portion which engages with the second guide portion, and the first guide portion and the first engagement portion are spaced apart from the second guide portion and the second engagement portion.

10. The image shake correction device according to claim 1, further comprising:

a third mooring member and a fourth mooring member which are arranged on a fourth straight line which is perpendicular to the third straight line and passes through the optical axis and are arranged on sides opposite to each other with the third straight line interposed therebetween when viewed in the optical axis direction, as the plurality of mooring members.

11. The image shake correction device according to claim 10, wherein the base member has a plurality of locking portions which locks one-side ends of the plurality of mooring members, and the locking portions are formed so as to protrude from a rear surface of the base member on a side opposite to a mount surface on which the lens frame is mounted in the optical axis direction.

12. The image shake correction device according to claim 11, wherein the bracket has a pair of arms which is bridged between the first axis and the second axis and a bridge which connects the pair of arms, and the bridge is arranged so as to be further away from the rear surface of the base member than the locking portion which locks the one-side end of the first mooring member.

13. The image shake correction device according to claim 12, wherein the guide portion has a first guide portion formed on one of the arms and a second guide portion formed on other of the arms, the engagement portion has a first engagement portion which engages with the first guide portion and a second engagement portion which engages with the second guide portion, and the first guide portion and the first engagement portion are spaced apart from the second guide portion and the second engagement portion.

14. The image shake correction device according to claim 1, wherein the base member has a plurality of locking portions which locks one-side ends of the plurality of mooring members, and the locking portions are formed so as to protrude from a rear surface of the base member on a side opposite to a mount surface on which the lens frame is mounted in the optical axis direction.

15. The image shake correction device according to claim 14, wherein the bracket has a pair of arms which is bridged between the first axis and the second axis and a bridge which connects the pair of arms, and the bridge is arranged so as to be further away from the rear surface of the base member than the locking portion which locks the one-side end of the first mooring member.

16. The image shake correction device according to claim 15, wherein the guide portion has a first guide portion formed on one of the arms and a second guide portion formed on other of the arms, the engagement portion has a first engagement portion which engages with the first guide portion and a second engagement portion which engages with the second guide portion, and the first guide portion and the first engagement portion are spaced apart from the second guide portion and the second engagement portion.

17. A lens device comprising the image shake correction device according to claim 1.

18. An imaging device comprising the image shake correction device according to claim 1.

* * * * *